Sept. 7, 1926.

G. R. HOFFMAN 1,599,235

AUTOMOBILE OR TRUCK TRANSMISSION

Filed March 7, 1923   3 Sheets-Sheet 1

Inventor
Glenn R. Hoffman,
By
Attorney

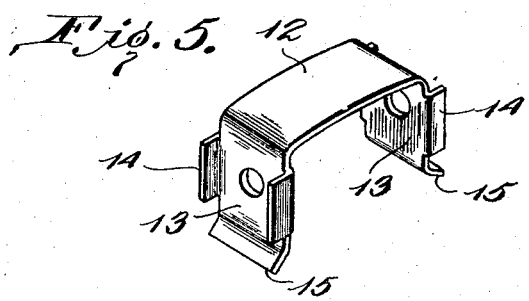
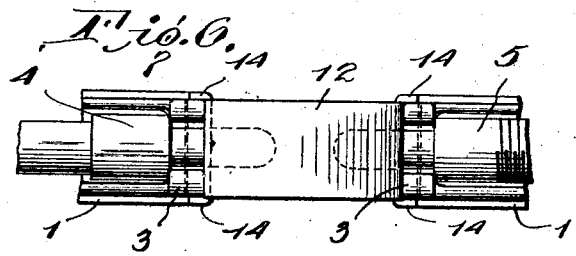
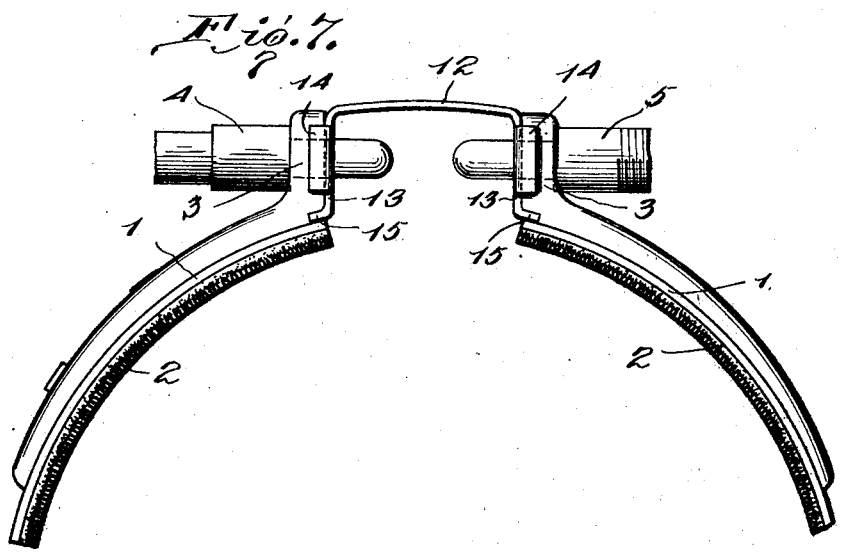

Sept. 7, 1926. 1,599,235
G. R. HOFFMAN
AUTOMOBILE OR TRUCK TRANSMISSION
Filed March 7, 1923   3 Sheets-Sheet 3
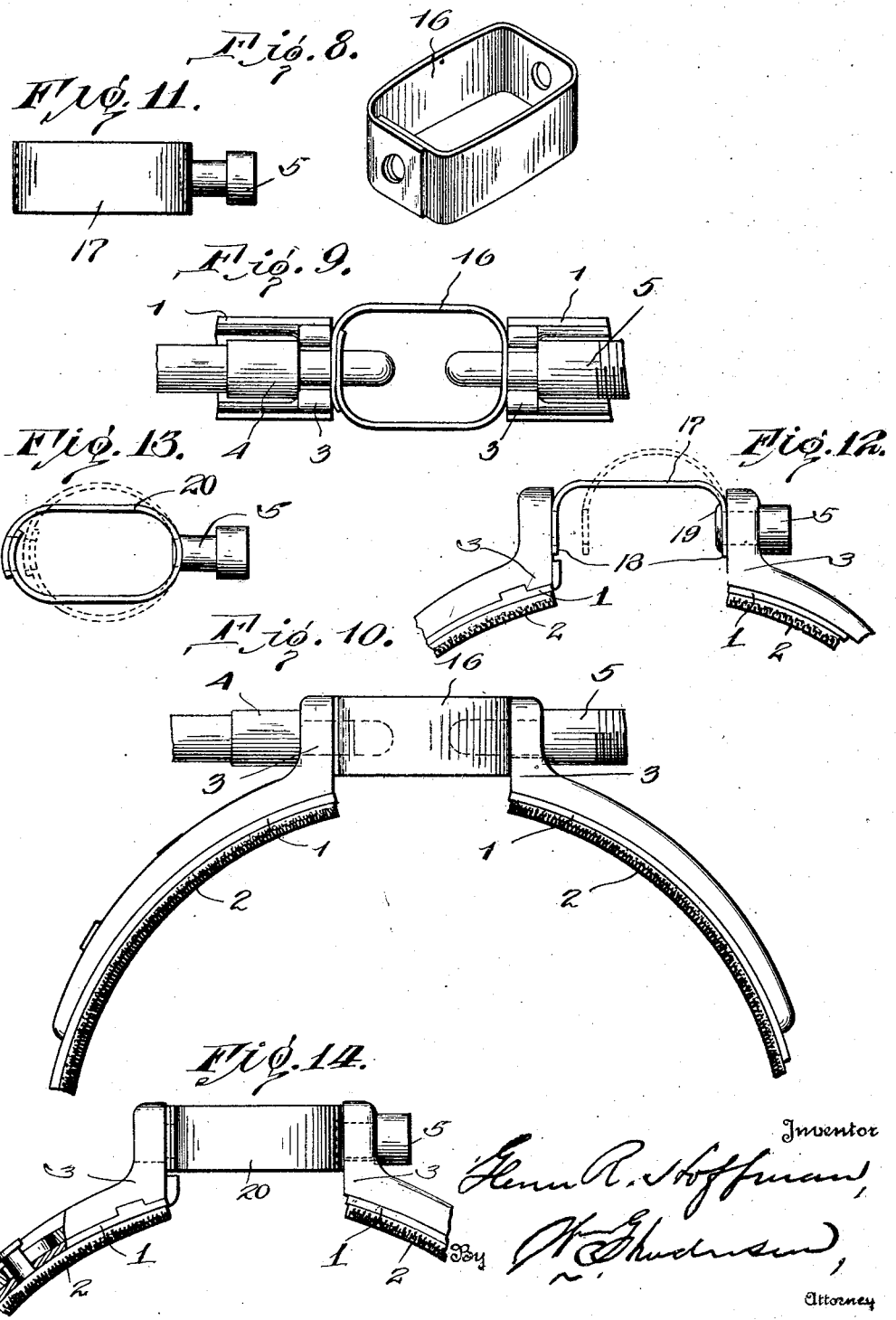

Patented Sept. 7, 1926.

1,599,235

UNITED STATES PATENT OFFICE.

GLENN R. HOFFMAN, OF SPRINGFIELD, ILLINOIS, ASSIGNOR TO HOFFMAN MANUFACTURING COMPANY, OF SPRINGFIELD, ILLINOIS, A CORPORATION OF ILLINOIS.

AUTOMOBILE OR TRUCK TRANSMISSION.

Application filed March 7, 1923. Serial No. 623,491.

My invention relates to transmissions, say of the planetary type, such as generally used in the Ford type of car, and has reference more particularly to the transmission bands which have associated with them a shaft, each, for adjustment of the band on the reverse-drum, on the slow-speed drum, and on the brake-drum, said shafts fitting in the notched ears of the band and each having connected thereto a foot pedal for operating the band against a spring, usually a coiled spring encircling the shaft which restores the band to normal conditions when the foot is removed from the pedal, which features and their associated co-acting parts are well known in the Ford type of transmission and therefore do not call for detail illustrations and description. The difficulties experienced in removing the transmission-bands from the drums for repair or other reasons by reason of interference from the associated parts of the transmission are well known and these difficulties are added to by reason of the shafts extending continuously or in one piece between the ears of the transmission bands, from one ear to the other, and further added to in the case of the shaft of the slow-speed transmission band because an extended longitudinal movement of that shaft is prevented by shouldered or enlarged parts of the shaft coming in contact with a part of the casing or other parts. To eliminate the difficulties mentioned, I make the shaft of the transmission band in two sections or parts with the adjacent ends of the two parts spaced apart from each other at a point between the ears of the transmission band. This results in requiring a shorter longitudinal movement of either one or both sections of the shaft so as to free the band from the shaft and leave the space above the axis of the shaft open and free for the removal of the band. In the drawings for purposes of illustration I have shown the invention embodied in the shaft of the slow speed transmission band but the same feature of the invention may be embodied in the shafts of the reverse band and the brake band as will be readily understood, the other features or elements of the associated parts being the same as heretofore and accordingly not requiring detailed illustration and description.

In the accompanying drawings—

Figure 1 is a detail fragmentary view of a slow-speed transmission band with my improved shaft applied;

Figure 2 a side view of the same parts;

Figure 3 a section through a part of the transmission housing, the screw for adjusting the band containing one part of the band shaft, and the nut lock;

Figure 5 shows a leaf or plate spring to fit between the ears of the band instead of a coil spring;

Figure 6 is a plan view similar to Fig. 1, with the flat expansion spring;

Figure 7 is a side view of Figure 5;

Figure 8 is another form of expansion spring to fit between the ears of the band;

Figure 9 is a top plan view similar to Figure 5 with the form of spring last mentioned;

Figure 10 is a side view of Figure 8;

Figure 11 shows another form of expansion spring to fit between the ears of a band;

Figure 12 is a side view showing the spring of Fig. 11 applied between the ears of the band;

Figure 13 is a plan view of another form of spring, and

Figure 14 is a side view showing such spring applied to a transmission band.

Figure 1:
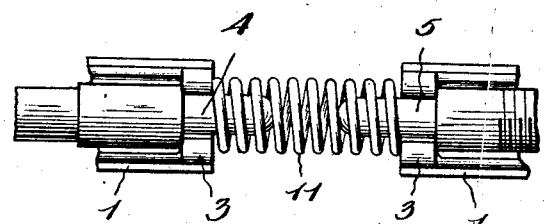
Figure 3:
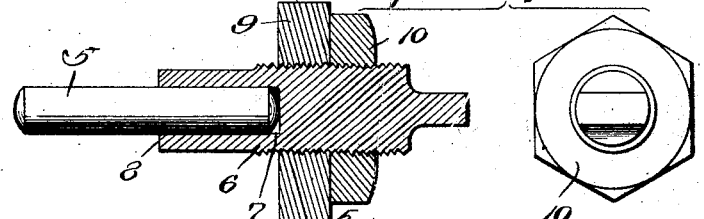
Figure 2:
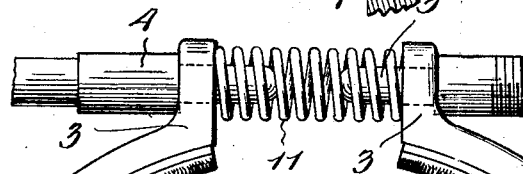
Figure 2:
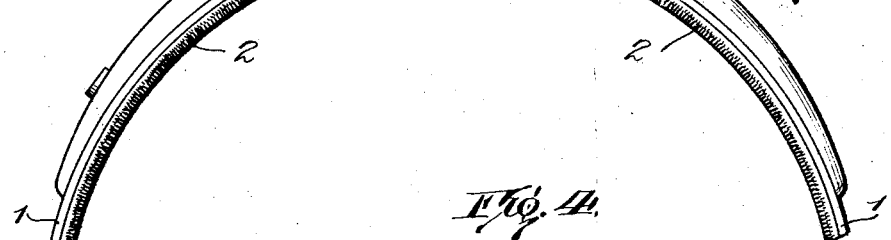
Figure 4:
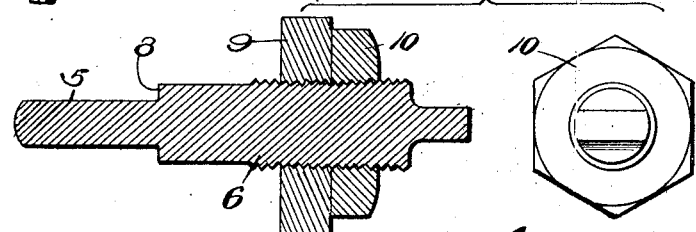
Figure 4 is a similar view of like parts, showing the adjusting screw and one part of the shaft made in one piece.

In the drawings, Figure 1, the numeral 1 designates the band, 2 its lining, and 3 its notched ears of any well known approved type. The numerals 4 and 5 designate the sections or parts constituting the shaft which fits in the notched ears of the band, the shaft selected for illustrative purposes being the slow-speed shaft. The part 5 of the shaft is the portion which has a threaded bearing in the transmission housing and is formed with a shoulder abutting against the adjacent ear of the band so that by turning the threaded portion the band is adjusted to its drum (not shown). The part 4 of the shaft is the portion to which the foot pedal (not shown) is attached as usual for pressing the usual shoulder against the adjacent ear of the band to operatively grip the drum to which the band is applied. The features of construction of the slow-speed band shaft and its operative connections mentioned for adjusting the band and for effecting its gripping action on the drum are not shown because such features are well known to those familiar with the Ford type of transmission and do not constitute the present invention. Heretofore the slow-speed transmission band shaft has been made in one piece, spanning entirely the space between the two notched ears of the band, or else one end next to the screw threaded adjusting end has been fitted in a socket formed in the threaded portion but in either case completely spanning the space between the two ears of the band. Under my invention I make this shaft in two sections or parts 4 and 5 with the adjacent ends spaced apart one from the other at a point between the two ears as illustrated in the several figures of the drawings. This makes possible a shorter longitudinal movement of either or both parts of the shaft for disconnecting the band from the shaft preparatory to removal of the band from its drum for relining or other purposes. It also facilitates the removal of the expansion or spreading spring between the ears and its replacement. The portion 5 of the improved two-part shaft may be formed as illustrated in Figure 3 or as in Figure 4 of the drawing. In Figure 3 it is formed of the diametrically enlarged threaded portion 6 formed with a socket 7 to receive a relatively short stem constituting the part 5 of the shaft which will be seated in the socket, or may be formed with a diametrically reduced stem portion formed integrally with the threaded portion 6 as illustrated in Figure 4. In either the reduced portion constitutes the member 5 of the shaft. In both forms the shoulder 8 is the part which bears against the adjacent ear of the band for adjustment purposes of the latter, and the threaded portion 6 fits in a threaded opening in the transmission housing, a portion 9 of which is illustrated, so as to serve as a screw for adjusting the band, the threaded portion being held to its adjustment by a locknut 10. In Figures 1 and 2 is illustrated a coiled transmission band spring 11 which performs the function usual to such springs.

In Figures 5, 6, and 7 a leaf or flat spring 12 is used instead of the coil spring shown in Figures 1 and 2. This spring has depending end portions 13 perforated for passage of the two parts 4 and 5 of the transmission band shaft, and is formed with lips 14 which bear against the sides of the notched ears 3 to prevent side movement of the spring and with flanges 15 which may fit corresponding recesses in the ears as shown in Figures 5, 6 and 7, to more firmly seat the spring in place. The two parts 4 and 5 of the transmission band shaft will be formed in all respects as described for Figures 1 to 4 and therefore need not be more in detail illustrated or described.

In Figures 8, 9 and 10 I illustrate another form of flat or leaf type of transmission band spring the same consisting of a looped shape member 16 having its two ends lapping each other and the opposite ends of the loop perforated to receive the two parts of the transmission band shaft and the shaft will have the features of construction for Figures 1 to 4 and therefore need not be more fully illustrated or described.

In Figures 11 and 12 is shown another form of flat or leaf type of spring, the same being designated by the numeral 17, and illustrated as an inverted U shape whose depending ends 18 are slotted so as to straddle the two parts or sections of the transmission band shaft as will be obvious from an inspection of Figure 12 where one member of the two-part shaft has been omitted and the other member 5 is shown as formed with an annular bead 19 which will tend to hold the spring in place. The dotted lines on Figure 12 indicates one U shape form that may be given to the spring instead of the elongated U shape shown in full lines.

In Figures 13 and 14 there is shown another form of flat spring which is designated by the numeral 20 and of substantially oval form as shown in full lines with the meeting ends lapping each other, or which may be of circular form as indicated by the dotted lines in the same figure. The ends of the loop will be apertured to receive the two parts of the transmission band shaft, one member of which is omitted from the drawing and the other shown in a conventional form.

As the construction of the two parts of the transmission band shaft will be substantially the same in the use of the different forms of transmission band shaft it is not necessary to repeat the illustration thereof in each of the figures used to show the different forms of spring, that may be employed.

In Figures 10, 12 and 14 of the drawing it is indicated that one of the ears of the transmission band may be made detachable but as that feature is not claimed herein, that construction is not shown and described in more detail.

By having the adjacent ends of the two-part shaft spaced apart it is made possible to prevent the band being contracted so far as to damage the drum by the metal of the band contacting with the drum when the lining wears to the extent to permit the same inasmuch as the adjacent ends of the two-part shaft will contact one with the other under the condition mentioned and thus prevent contraction beyond a given point that would damage the drum.

Having described my invention and set forth its merits what I claim is:—

1. In a transmission, a transmission band provided at its ends with apertured ears, a two-part shaft fitting in the apertured ears and having its adjacent ends spaced apart between the ears, and a spring interposed between the ears.

2. In a transmission, a transmission band provided with apertured ears, a two-part shaft in which portions of the shaft pass through the apertured ears of the band and have their adjacent ends spaced apart, one section of the shaft forming a part of an adjusting screw, and a spring to exert pressure to spread the band when not under compression.

3. In a transmission, a transmission band provided at its ends with apertured ears, a two-part shaft fitting in the apertured ears and having its adjacent ends spaced apart between the ears, abutments on the two parts of the shaft to bear against the outer faces of the ears to move one ear towards the other in contracting the band, and a spring between the ears.

4. In a transmission, a transmission band provided with apertured ears, a two part shaft fitting in the apertured ears, and having its adjacent ends spaced apart, an abutment on each of the two parts of the shaft to bear against the outer faces of the ears to move one ear towards the other in contracting the band, a screw threaded member having one part of the shaft formed as a part thereof and adapted to adjust the band, and a spring between the ears.

5. In a transmission, a transmission band provided with apertured ears, a two part shaft fitting in the apertured ears and having its adjacent ends spaced apart and each formed with an abutment to bear against the outer faces of the ears, and a plate spring formed with apertures for passage of the two parts of the shaft and exerting pressure on the band ears.

6. In a transmission, a transmission band provided at its ends with apertured ears, a two-part shaft fitting in the apertured ears and having its adjacent ends spaced apart, and a plate spring formed with apertures for passage of the two parts of the shaft and having lips bearing against the ears.

7. An automobile-transmission comprising band-actuating means including a pair of oppositely disposed longitudinally spaced spring-supporting members.

8. An automobile-transmission comprising band-actuating means including a pair of oppositely disposed longitudinally spaced band-engaging and spring-supporting members.

9. An automobile-transmission comprising a split-band, apertured ears upon the band, and band-actuating means including a pair of oppositely disposed spring-supporting shaft-extensions projecting through the apertures of the ears, said extensions being longitudinally spaced the one from the other at their inner ends.

10. An automobile-transmission comprising a drum, a split-band encircling the drum, and apertured ears upon the ends of the band, in combination with means for actuating the band into and out of clutching engagement with the drum, said means including a pair of members having bearing engagement with the outer faces of the ears, extensions upon said members oppositely projecting inwardly through the apertures of the ears, and a spring supported by said extensions and having bearing-engagement at its opposite ends with the inner faces of the ears.

11. An automobile-transmission comprising a drum, a split-band encircling the drum, and apertured ears upon the ends of the band, in combination with means for actuating the band into and out of clutching engagement with the drum, said means including a pair of members having bearing engagement with the outer faces of the ears, extensions upon said members oppositely projecting inwardly through the apertures of the ears and longitudinally spaced the one from the other at their inner ends, and a spring at its opposite ends supported by said extensions and having bearing engagement with the inner faces of the ears.

12. An automobile-transmission comprising a housing, a drum disposed within the housing, and a split-band encircling the drum, in combination with means for actuating the band into and out of clutching engagement with the drum, said means including an apertured ear upon the band, a member having adjustable engagement with the housing and bearing engagement with the ear, and a spring-supporting extension projecting inwardly from the member through the aperture of the ear.

13. An automobile-transmission comprising a housing, a drum disposed within the housing, and a split-band encircling the drum, in combination with means for actuating the band into and out of clutching engagement with the drum, said means including an apertured ear upon the band, a member having adjustable threaded engagement with the housing and bearing engagement with the ear, and a diametrically reduced spring-supporting extension upon the member projecting inwardly through the aperture of the ear.

14. An automobile-transmission comprising a housing, a drum disposed within the housing, and a split-band encircling the drum, in combination with means for actuating the band into and out of clutching engagement with the drum, said means including apertured ears upon the ends of the band, a member mounted for rotatory movement upon the housing and having bearing engagement with the outer face of one of the ears, a shaft having threaded engagement with the housing for lengthwise adjustment and having bearing engagement with the outer face of the other ear, extensions upon said member and said shaft oppositely projecting inwardly through the apertures of the ears, and a spring supported by said extensions and having bearing engagement at its opposite ends with the inner faces of the ears.

15. An automobile-transmission comprising a housing, a drum disposed within the housing, and a split-band encircling the drum, in combination with means for actuating the band into and out of clutching engagement with the drum, said means including apertured ears upon the ends of the band, a member mounted for rotatory movement upon the housing and having bearing engagement with the outer face of one of the ears, an extension upon the member projecting inwardly through the aperture of said ear, a shaft having threaded engagement with the housing for lengthwise adjustment and having bearing engagement with the outer face of the other ear, an integral diametrically reduced longitudinal extension upon the shaft projecting inwardly through the aperture of said other ear, and a spring supported by said extensions and having bearing engagement at its opposite ends with the inner faces of the ears.

In testimony whereof I affix my signature.

GLENN R. HOFFMAN.